United States Patent [19]
Poon et al.

[11] Patent Number: 4,457,767
[45] Date of Patent: Jul. 3, 1984

[54] ALUMINA-ZIRCONIA ABRASIVE

[75] Inventors: Simon Poon; Ronald W. Frischuk, both of Niagara Falls, Canada

[73] Assignee: Norton Company, Worcester, Mass.

[21] Appl. No.: 537,214

[22] Filed: Sep. 29, 1983

[51] Int. Cl.³ .............................................. C09K 3/14
[52] U.S. Cl. ....................................... 51/298; 51/309; 501/105
[58] Field of Search ................... 51/298, 309; 501/105

[56] References Cited

U.S. PATENT DOCUMENTS

| | | | |
|---|---|---|---|
| 3,454,385 | 7/1969 | Amero | 51/309 |
| 3,881,282 | 5/1975 | Watson | 51/309 |
| 3,891,408 | 6/1975 | Rowse et al. | 51/298 |
| 3,993,119 | 11/1976 | Scott | 164/330 |
| 4,059,417 | 11/1977 | Ilmaier et al. | 51/309 |
| 4,126,429 | 11/1978 | Watson | 51/309 |
| 4,194,887 | 3/1980 | Veltz et al. | 51/309 |

Primary Examiner—Donald E. Czaja
Assistant Examiner—W. Thompson
Attorney, Agent, or Firm—Rufus M. Franklin

[57] ABSTRACT

Abrasive properties of co-fused alumina zirconia are improved by the addition of from 0.1 to 2% of $Y_2O_3$ to the fusion mix and quenching the fused product. $Y_2O_3$ ores containing mostly $Y_2O_3$ with lesser amounts of rare earth oxides can be substituted for high purity $Y_2O_3$.

4 Claims, No Drawings

ALUMINA-ZIRCONIA ABRASIVE

FIELD OF THE INVENTION

This invention relates to co-fused alumina zirconia abrasives.

BACKGROUND OF THE INVENTION

U.S. Pat. No. 3,891,408 discloses co-fused alumina zirconia abrasives of eutectic and near eutectic composition (35-50% zirconia), particularly suitable for low and moderate pressure grinding for which the previously known alumina-ziconia abrasives were not most useful.

The present invention is an improvement over the abrasive disclosed in U.S. Pat. No. 3,891,408, which improvement has been found particularly useful in improving the performance of coated abrasive products.

SUMMARY OF THE INVENTION

The invention consists in an alumina-zirconia abrasive product of eutectic or near eutectic composition, as disclosed in U.S. Pat. No. 3,891,408, but differing from such abrasive in the inclusion of from 0.1 to 2.0 weight percent of yttrium oxide, calculated as $Y_2O_3$. The abrasive is made by fusing alumina, zirconia, and $Y_2O_3$ or a precursor thereof in an arc furnace as, for example, taught in U.S. Pat. No. 3,891,408.

The fusion is preferably conducted, at least at the time the fused product to be poured into molds to rapidly chill it, under slightly reducing conditions so that some reduction products such as suboxides, carbides, nitrides, carbonitrides, oxynitrides, or even some elemental metal, are present in small but discernable amounts. The product thus has a black appearance, with sometimes visible gold metallic areas, rather than having a light colored or whitish appearance. The presence of such partially reduced material can also be demonstrated by the presence of a few tenths of a percent by weight of nitrogen and carbon, and by a weight gain upon forced oxidation of 3% or less.

It is essential that the product be rapidly chilled from the molten state so that a fine crystal structure is produced, as described in prior U.S. Pat. No. 3,891,408, whereby the average rod spacing at the center of eutectic colonies is less than 4000 Angstroms.

To ensure reducing conditions readily oxidizeable material such as carbon or aluminum or zirconium metal may be added just before the pouring of the melt into the chilling molds.

After cooling, the product is crushed, for example, by a roll crusher, and screened and separated into useable size portions of abrasive grits. The grits may then be applied to prepared flexible backings to produce coated abrasive products in any conventional manner well known in the art.

The effect of the addition of $Y_2O_3$ to the fusion is believed to be to lower the content of monoclinic zirconia thus minimizing cracking due to the phase transformation (tetragonal to monoclinic). This results in high hardness.

EXAMPLE I

A 3,430 pound batch containing the following materials was prepared:

| | |
|---|---|
| Q5A10 Zirconia | 34% |
| Alumina | 35% |
| Scrap alumina-zirconia (fused) | 15% |
| Oversize alumina-zirconia (fused) | 15% |
| Coal | 1% |

Typical analysis of the Q5A10 zirconia is as follows:

| | |
|---|---|
| $SiO_2$ | 5.22 |
| $Fe_2O_3$ | 0.12 |
| $TiO_2$ | 0.51 |
| $Al_2O_3$ | 10.98 |
| $ZrO_2$ | 82.97 |
| CaO | 0.09 |
| MgO | 0.02 |

The mixture was fused in the electric arc furnace in the conventional manner. After start-up feed of the mix was completed in 15 minutes, fusion was continued for 20 minutes at which time $Y_2O_3$ was added, over a 5 minute interval, in an amount to result in 0.5% $Y_2O_3$ in the final product; then aluminum metal (4% of mix) was added and, after the elapse of 15 more minutes (for a total time from feed to tap of 55 minutes). The molten product was cast between steel plates spaced 3/16" of an inch apart (using a mold such as disclosed in U.S. Pat. No. 3,993,119).

The chemical analysis of the fused, solidified product in weight %, designated HPD-022 was:

| | |
|---|---|
| $SiO_2$ | 0.13 |
| $Fe_2O_3$ | 0.32 |
| $TiO_2$ | 0.07 |
| $ZrO_2$ | 39.99 |
| $Al_2O_3$ | 58.69 (by difference) |
| CaO | 0.06 |
| MgO | 0.02 |
| Hf | 0.70 |
| $Y_2O_3$ | 0.50 |

EXAMPLE 2

This example (A2047) was carried out in a small (200 pound capacity) arc furnace. The mix consisted of:

| | |
|---|---|
| Oversized fused alumina-zirconia lumps | 86% |
| Q5A10 | 9% |
| Al° ingot (added separately 15 minutes before tap) | 4% |

In this run, the feed was completed after 25 minutes from start-up, after 5 more minutes of fusion, yttria was added to give 0.42% in the product; the addition was completed after 5 minutes at which time the aluminum metal was added, and 15 minutes from the beginning of the aluminum addition the furnace was tapped, using the same mold as in Example 1.

EXAMPLE 3

This was identical to Example 2, except that instead of high purity $Y_2O_3$, a low cost $Y_2O_3$ source was used which contained 63% $Y_2O_3$, with the balance made up of rare earth oxides. No significant difference in properties was found as compared with a product made from 99.9% pure $Y_2O_3$.

The analysis of two sources of impure $Y_2O_3$ found useful were:

| Oxide | Source A | Source B |
|---|---|---|
| $Y_2O_3$ | 63 | 63 |
| $La_2O_3$ | .5 | 1.3 |
| $CeO_2$ | 1 | 5.2 |
| $Pr_6O_{11}$ | .5 | .6 |
| $Nd_2O_3$ | 1 | 1.7 |
| $Sm_2O_3$ | 2 | 1.4 |
| $Ev_2O_3$ | .5 | .1 |
| $Cd_2O_3$ | 5 | 3.3 |
| $Tb_4O_7$ | 1.7 | .5 |
| $Dy_2O_3$ | 11 | 6.8 |
| $Ho_2O_3$ | 2.7 | 2.2 |
| $Er_2O_3$ | 6.4 | 4.5 |
| $Tm_2O_3$ | 1 | .9 |
| $Yb_2O_3$ | 4.7 | 9.7 |
| $Lo_2O_3$ | 1 | — |

Of these materials, $La_2O_3$—$Sm_2O_3$ are expected to be less desirable, due to their lower solubility in $ZrO_2$ at high temperatures. The oxides $Tb_4O_7$—$Lu_2O_3$ are expected to mimic closely the behavior of $Y_2O_3$ (by inspection of phase diagrams published as "Phase Diagrams for Ceramists"—American Ceramic Society) and are hence thought to be good.

The abrasive of Example 1 was crushed to produce an elongated shaped abrasive and compared to a similarly crushed abrasive of the same general composition but without yttria. The abrasive, in the 36 grit size, showed an average overall quality improvement of about 25% in a variety of coated abrasive belt grinding tests, in grinding steels. The 50 grit product showed an average improvement of only over 5% in the 50 grit size.

In resin bonded cut-off wheels, for cutting steel, there was a 26% improvement over the standard, and in steel grinding with resin bonded disc wheels, the improvement was 23%. In the case of the wheel tests the crushing procedure was altered to produce a blocky shape of grit.

Physical hardness and fracture toughness testing indicates an improvement in such properties having an optimum between 0.5 and 1% $Y_2O_3$, with significant property improvements over the same abrasive, but without $Y_2O_3$ from 0.1% to 2% $Y_2O_3$.

What is claimed is:

1. Fused alumina/zirconia near eutectic abrasive grits with 0.1 to 2.0% by weight of yttrium oxide calculated at $Y_2O_3$, and having a maximum spacing of zirconia rods of 4,000 Angstroms, as measured at the eutectic cell centers.

2. An abrasive material as in claim 1 in which the yttrium oxide content is from 0.4 to 0.7%.

3. A coated abrasive sheet material having the abrasive grits of claim 1 bonded to at least one side thereof.

4. A grinding wheel having the abrasive grits of claim 1 bonded thereon by an organic resin matrix.

* * * * *

UNITED STATES PATENT OFFICE
CERTIFICATE OF CORRECTION

PATENT NO. : 4,457,767

DATED : July 3, 1984

INVENTOR(S) : Simon Poon and Ronald W. Trischuk

It is certified that error appears in the above-identified patent and that said Letters Patent are hereby corrected as shown below:

On the front page under "Inventors" correct the spelling of "Trischuk".

Signed and Sealed this

Twenty-sixth Day of February 1985

[SEAL]

Attest:

DONALD J. QUIGG

Attesting Officer     Acting Commissioner of Patents and Trademarks